United States Patent [19]

Leatherman

[11] Patent Number: 5,722,352
[45] Date of Patent: Mar. 3, 1998

[54] APPARATUS AND METHOD FOR REDUCING EQUINE CRIBBING BEHAVIOR

[75] Inventor: Nelson E. Leatherman, 1401 Hands Mill Rd., Rock Hill, S.C. 29732

[73] Assignee: Nelson E. Leatherman, Rock Hill, S.C.

[21] Appl. No.: 758,923

[22] Filed: Dec. 2, 1996

[51] Int. Cl.[6] ................................ A01K 15/00
[52] U.S. Cl. ........................................ 119/822
[58] Field of Search ..................... 119/814, 815, 119/821, 822

[56] References Cited

U.S. PATENT DOCUMENTS

| | | | |
|---|---|---|---|
| 487,461 | 12/1892 | Whitefield | 119/822 |
| 2,212,160 | 8/1940 | Kelly | 119/822 |
| 2,263,503 | 11/1941 | Kennedy | 119/822 |
| 2,510,337 | 6/1950 | Franklin | 119/822 |
| 2,602,421 | 7/1952 | Barker | 119/822 |
| 2,628,592 | 2/1953 | Johnston | 119/822 |
| 2,658,478 | 11/1953 | Jones | 119/822 |
| 2,722,912 | 11/1955 | Lindstrom et al. | 119/822 |
| 2,725,037 | 11/1955 | Ritchey | 119/822 |
| 2,783,740 | 3/1957 | Haggard | 119/822 |
| 2,830,556 | 4/1958 | Grams | |
| 2,842,099 | 7/1958 | Miller | 119/822 |
| 2,940,425 | 6/1960 | Dykens | 119/822 |
| 2,997,023 | 8/1961 | Ritchey | 119/822 |
| 3,687,112 | 8/1972 | Henderson | 119/822 |
| 4,153,009 | 5/1979 | Boyle | 119/822 |
| 4,476,810 | 10/1984 | Heras | 119/822 |
| 4,539,937 | 9/1985 | Workman | 119/822 |
| 4,945,860 | 8/1990 | Walker | |

*Primary Examiner*—Thomas Price
*Attorney, Agent, or Firm*—Rankin, Hill, Porter & Clark

[57] ABSTRACT

Apparatus for substantially reducing equine cribbing behavior, comprising: a collar that can be placed about the neck of a horse, and a control circuit carried by the collar for applying a shock to the horse; the control circuit comprising a first sensor that detects an equine characteristic related to cribbing activity and a second sensor that detects equine activity other than cribbing; the control circuit comprising a logic circuit for preventing the application of a shock to the horse in response to a detected equine cribbing characteristic when the second sensor detects equine activity other than cribbing.

20 Claims, 4 Drawing Sheets

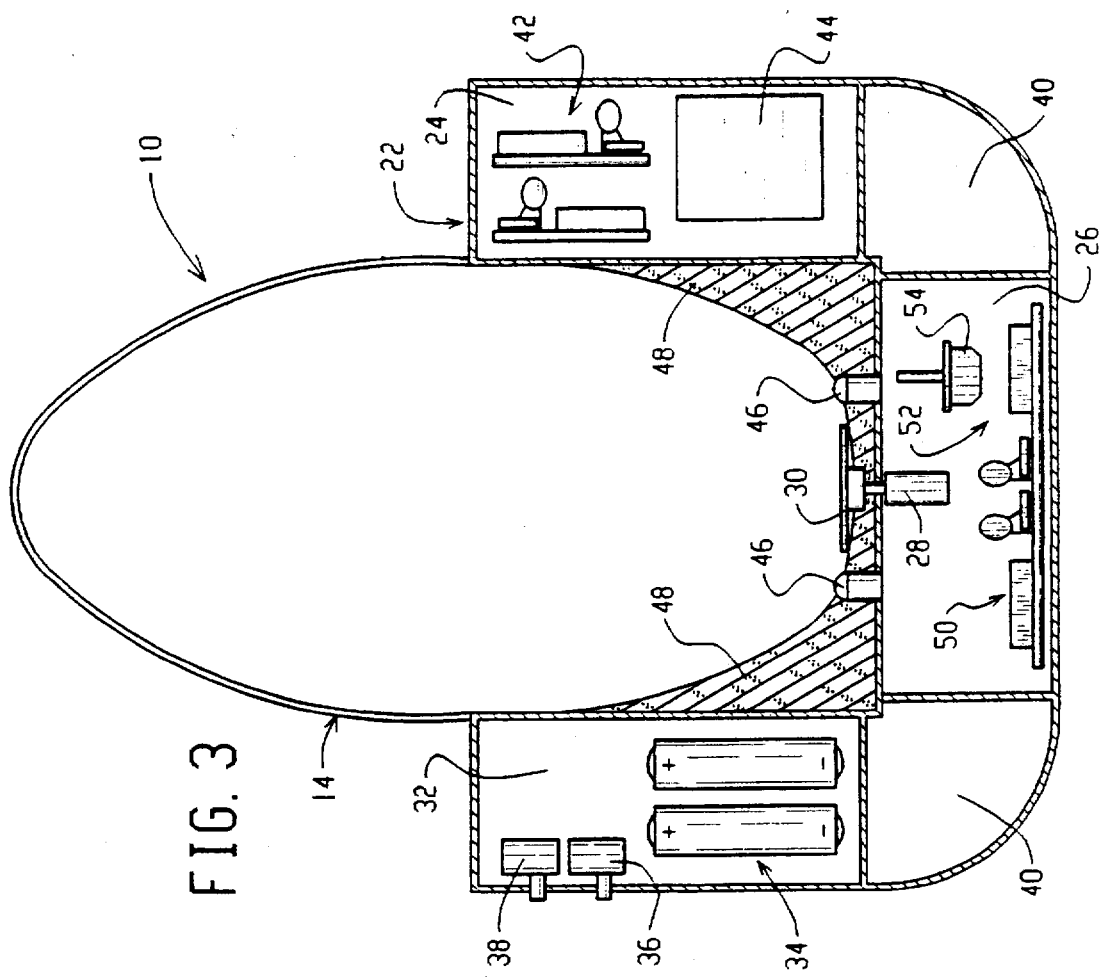
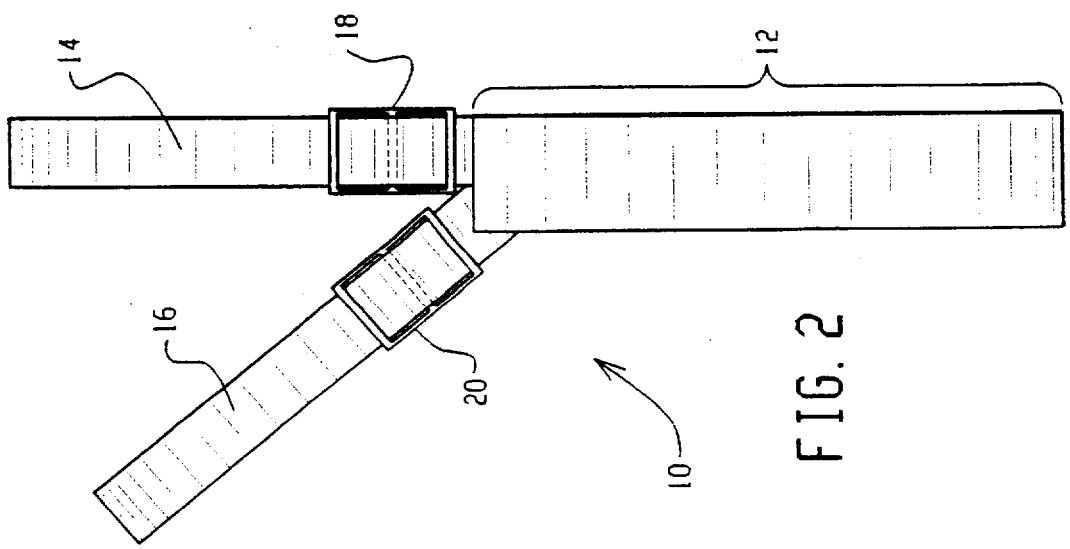

APPARATUS AND METHOD FOR REDUCING EQUINE CRIBBING BEHAVIOR

BACKGROUND OF THE INVENTION

1. Field of the Invention

This invention relates generally to techniques for substantially reducing or eliminating equine cribbing behavior. More particularly, the invention relates to the application and use of adverse shock therapy upon detection of cribbing activity using an electronic apparatus that further prevents the application of such shock therapy during normal equine activities.

2. Description of the Prior Art

Equine cribbing behavior is a highly undesirable equine activity that occurs in an estimated 5–15% of the equine population. The causes of such behavior may include boredom, learned behavior and genetics. Equine cribbing activity is harmful to the horse as well as to the stable property and, therefore, usually needs to be corrected.

Various techniques have been tried over the years to correct cribbing activity. In one technique, a cribbing strap prevents the accessory respiratory muscles from pulling the larynx in the caudal direction. The cribbing strap, however, is largely ineffective for most horses. U.S. Pat No. 487,461 issued to Whitefield relates to the application of an electrical shock to the horse when cribbing activity is detected, including the use of a neck strap to carry part of the apparatus. The neck strap carries a contact plate that detects abnormal enlargement of the horse'neck. The Whitefield technique, however, has several undesirable limitations including the restricted movement of the tethered horse during use of the apparatus, and the likely occurrence of applying an electrical shock to the horse during normal activity that could inadvertently be detected as cribbing. The latter problem occurs because an enlarged neck can occur during normal activity as well as during cribbing. Furthermore, because the horse must be tethered during use of the apparatus, the technique is largely ineffective for modifying cribbing activity during free range movement of the horse.

More drastic techniques for modifying cribbing behavior in horses include surgical procedures such as myectomies and neurectomies, but such procedures are expensive, can cause disfigurement and produce variable results.

The objectives exist, therefore, for improved apparatus and methods for substantially reducing or eliminating equine cribbing activity by the application of an adverse shock therapy during cribbing. Such technique should preferably be useful during free range movement of the horse in paddock or field, and should prevent or reduce the application of such therapy during normal equine activities without reducing the effectiveness against cribbing activity.

SUMMARY OF THE INVENTION

The present invention contemplates, in one embodiment, apparatus for substantially reducing equine cribbing behavior, comprising: a collar that can be placed about the neck of a horse, and a control circuit carried by the collar for applying a shock to the horse; the control circuit comprising a first sensor that detects an equine characteristic related to cribbing activity and a second sensor that detects equine activity other than cribbing; the control circuit comprising logic means for preventing the application of a shock to the horse in response to a detected equine cribbing characteristic when the second sensor detects equine activity other than cribbing.

The present invention also contemplates the methods embodied in the use of such apparatus as well as in another embodiment, a method for substantially reducing equine cribbing behavior, comprising the steps of:

(a) electronically detecting an equine characteristic related to cribbing activity;

(b) electronically detecting equine movement other than cribbing that causes false cribbing activity detection; and (c) applying a shock to the horse only when cribbing activity is detected and equine movement other than cribbing is not detected.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

FIG. 2 is a more detailed illustration in side elevation of a cribbing collar useful with the present invention.

FIG. 3 is a detailed illustration of a cribbing collar in accordance with the invention as viewed from the forward facing side of the apparatus.

DETAILED DESCRIPTION OF THE PREFERRED EMBODIMENT

Figure 1:
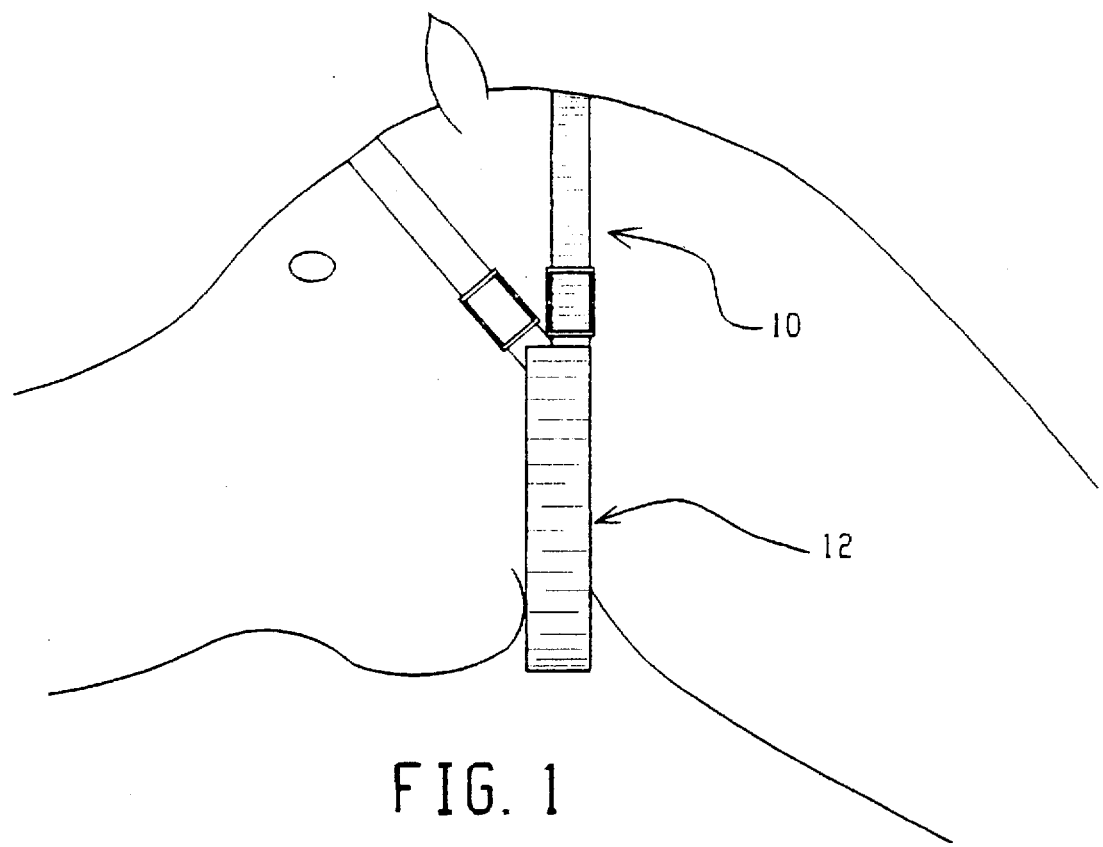
FIG. 1 is a simplified representation of an apparatus that embodies the present invention with an illustration of a typical use thereof.

With reference to the drawings, an embodiment of the invention is illustrated in FIG. 1 in a manner that it typically could be used. Although the invention is described herein with reference to the application of an adverse shock therapy to the horse in the preferred form of an electrical shock, this description is intended to be exemplary in nature and should not be construed in a limiting sense. Other forms of shock therapy could be administered to the horse, either alone or in combination, including vibration shock, auditory shock, odoriferous shock and so forth. The invention thus more generally contemplates the administration of an adverse shock therapy to a horse as a result of the use of a cribbing activity sensor in accordance with the invention.

In FIG. 1, this embodiment of the invention includes a cribbing collar 10 that is adjusted to fit securely on a horse's head and neck. The collar 10 carries an electronic control device 12. The collar 10 is configured so that when it is correctly positioned on the horse, as in FIG. 1, a sensor that is part of the electronic device 12 is positioned adjacent to the throttle area. As illustrated in more detail in FIG. 2, the collar 10 carries the electronic control device 12 at the lower end of the collar 10. The collar 10 includes a poll strap 14 and a brow strap 16. The poll strap 14 and the brow strap 16 are provided with respective buckle devices 18 and 20 to facilitate proper sizing for different horses and secure placement of the collar on a horse's head and neck. The straps are preferably made of non-conductive low stretching material such as conventional nylon webbing or leather straps.

Figure 1A:
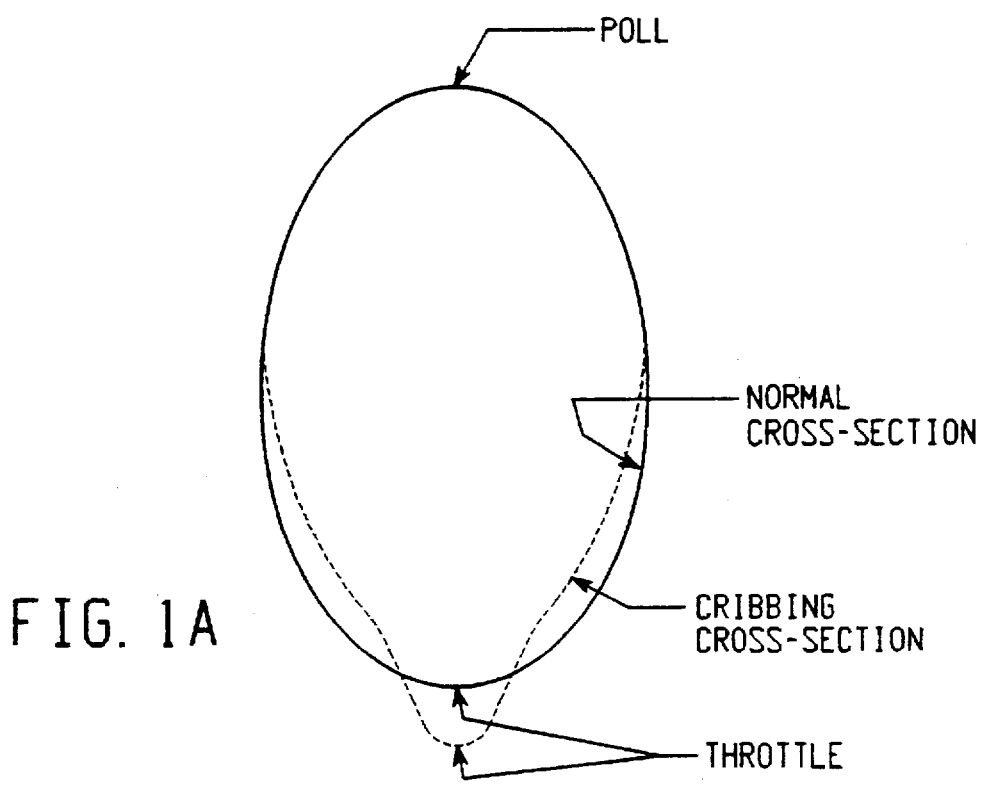
FIG. 1A is a partial sectional view of a horse's neck and illustrates a typical effect in a horse's throttle caused by cribbing activity.

Cribbing activity is accompanied by a detectable equine characteristic, in this case a contraction of the ventral cribbing muscles. This produces an increase in the poll-throttle dimension as illustrated in phantom in the partial section view of FIG. 1A. During such cribbing activity, the ventral muscles, which are normally very flaccid, become momentarily hard and visibly distended when the ventral muscles are contracted. A sensor is used to detect cribbing activity by detecting this distention of the ventral muscles. The sensor then activates a shock therapy device carried by the collar 10, in this case applying an electrical shock to the horse. However, such distention of the ventral muscles can also accompany normal equine activity, particularly during free range movement of the horse. Such normal activities may include galloping, rolling, jumping, extreme head and neck movement, and rapid head and neck movement. Such normal activity could be falsely detected as cribbing activity if only a single sensor is used to detect the ventral muscle contraction. In further accordance with the invention then, the invention contemplates the use of a second sensor that inhibits the application of a shock therapy when normal equine activity other than cribbing is detected, in which such detected activity would indicate that the ventral muscle contraction is not due to cribbing activity.

With reference then to FIG. 3, the collar 10 carries a housing 22 which for convenience can be in the form of a compartmentalized box or other suitable rigid structure that will support and protect various electronic elements therein. For example, a first side compartment 24 can be used to house or retain part of the electronic control circuits. A second or lower side compartment 26 is positioned by the collar 10 just below the throttle, and carries a first sensor 28 in the form of a pressure switch. The pressure switch 28 is activated by a pressure pad 30 that preferably directly contacts the throttle and ventral muscles when the collar 10 is properly strapped on the horse's head and neck. The collar 10 straps 14,16 preferably grasp the bulk of the horse's neck and hold the sensing pad 30 against the ventral muscles. The use of leather or nylon webbing straps should prevent slippage of the collar 10 during normal equine activity without unnecessary discomfort to the horse.

A third side compartment 32 is used to hold a self-contained and replaceable power supply 34, such as conventional batteries. Since the application of an electrical shock is only momentary and over time should occur less and less (due to learned behavior of the horse to avoid such shocks by not engaging in cribbing activity), the present invention can easily be realized with the use of minimal power requirements. A main power switch 36 such as a conventional slide switch can be used to externally activate the apparatus after the collar 10 is strapped on. A separate externally controlled switch 38 can be used to separately turn off power to the stimulator device if needed.

The collar can include one or more wedges 40 to provide rigidity to the collar 10 and eliminate sharp exterior corners in the collar. Those skilled in the art will appreciate that the collar 10 design is exemplary and that many different forms could be used, with an important feature being the consistent and stable positioning of the sensor pressure pad 30 against the throttle.

The first side compartment 24 in this embodiment houses a stimulator circuit 42 which is used for administering an electrical shock therapy to the horse under conditions in which cribbing related activity is detected but normal non-cribbing activity has not been detected. The stimulator circuit 42 includes a transformer 44 for developing the high voltage shock, as will be described in greater detail hereinafter.

The transformer 44 is connected to a pair of electrodes 46 which protrude through the inner liner of the collar 10 and contact the horse's neck when the collar 10 is strapped on the horse. Padding 48 can be used on the interior of the collar 10 to make the collar 10 more comfortable when worn and also to reduce slippage of the collar 10 during vigorous equine activity.

The lower side compartment 26 also houses a trigger pulse circuit 50 and an inhibit circuit 52. The trigger circuit 50 detects an output of the first sensor 28 that corresponds to actuation of the first sensor 28. The trigger circuit 50 produces a trigger pulse of fixed duration in response to the output change of the sensor 28. The trigger pulse occurs once for each momentary actuation of the sensor 28, even if the sensor 28 remains actuated for an extended period of time. The trigger circuit 50 is designed so that the sensor 28 must open again before another trigger pulse can be generated.

Also disposed in the lower compartment 26 is a second sensor 54 used as an inhibit switch. In the present embodiment, the inhibit switch 54 is realized in the form of an omnidirectional tilt switch, such as part No. ODC3-30 available from Mercury Switches, Inc. Other types of acceleration, motion or position switches, or combinations thereof, could alternatively be used. The inhibit switch 54 is selected so as to detect normal equine activity, such as rapid or extreme movement of the head and neck that occurs during activities as described hereinbefore, that could be accompanied by a distention of the ventral muscles without involving cribbing activity. Thus, in accordance with a general aspect of the invention, the inhibit switch 54 is used to detect normal equine activity that could cause false cribbing activity indications by the first sensor 28. Because in this embodiment the first sensor is used to detect distended ventral muscles, the second sensor 54 is selected so as to detect activity that could cause ventral distention unaccompanied by cribbing activity. Thus, the particular second sensor 54 used and the normal activities detected thereby will be determined by the nature of the equine characteristic detected by the first sensor 28.

The inhibit circuit 52 detects actuation of the second sensor 54 and produces an output that prevents the trigger circuit 50 from activating the stimulator circuit 42. Preferably, the inhibit circuit 52 includes a delay, such as a 2 to 4 second delay beyond the time that the detected normal activity ends (as indicated by a return of the switch 54 to its normal output state) to prevent overlapping switch transitions from causing improper application of a stimulus at the end of a normal activity. In the present embodiment, the inhibit switch 54 detects movement of the horse's head or neck beyond 30 degrees from a selected normal position, and/or detects rapid movement of a preselected degree. Other equine characteristics or required degree of movement for actuation of the inhibit switch 54 can be selected if needed for a particular horse or activity.

Figure 4:
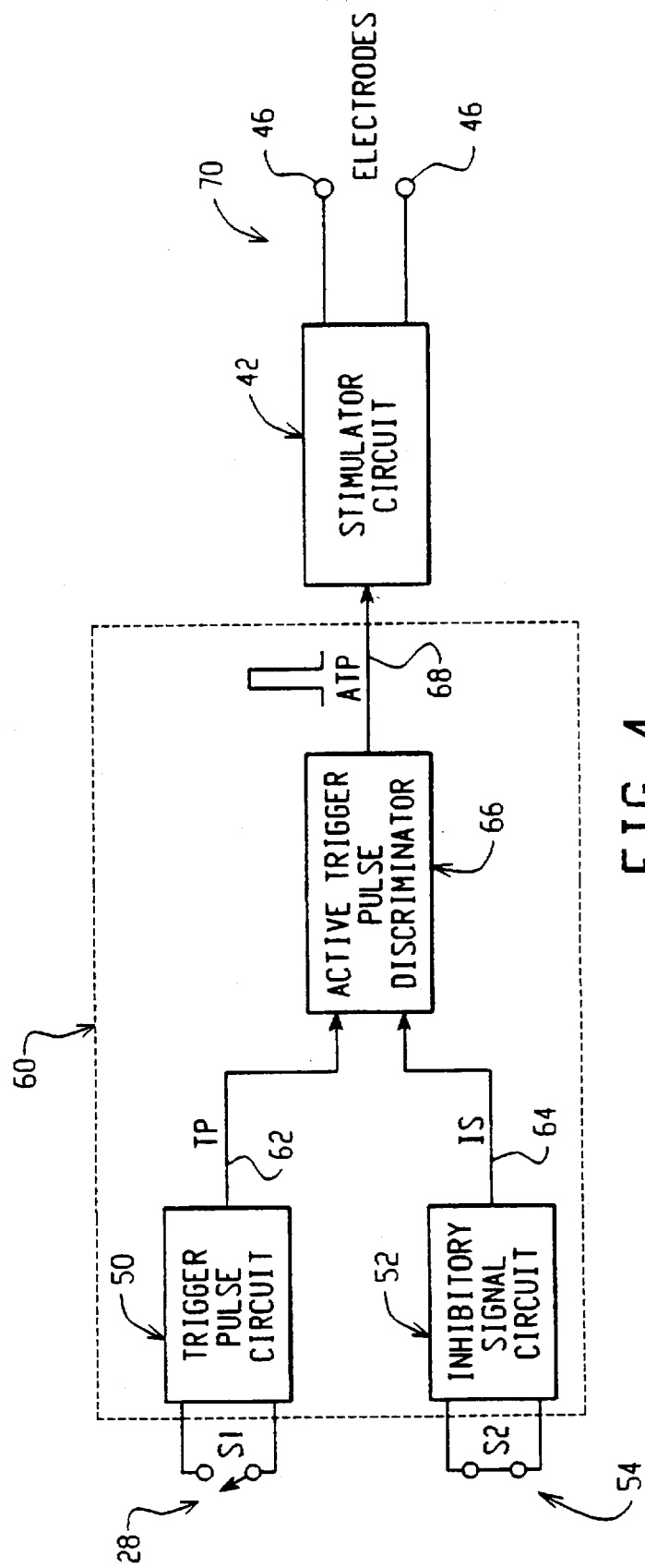
FIG. 4 is a functional block diagram of a suitable control circuit for carrying out the present invention.

With reference next to FIG. 4, a functional block diagram is provided for a control circuit 60 suitable for carrying out the various functions just described. The control circuit 60 includes the trigger pulse circuit 50, that produces a high output trigger pulse (TP) 62 when cribbing activity is detected as indicated by the state of the first sensor 28. In this embodiment, the sensor 28 is realized in the form of a normally open momentary switch actuated by a force applied to the pressure pad 30. The control circuit 60 further includes the inhibit circuit 52 which produces a low output inhibit signal (IS) 64 whenever equine activity is detected that indicates that the trigger signal 62 may be a false indication of cribbing activity. In this example, the low inhibit signal 64 is produced in response to extreme or rapid movement of the horse's head and/or neck as indicated by the output of the second sensor 54. In this embodiment, the second sensor 54 is realized in the form of a movement detection switch such as a normally closed omnidirectional tilt switch. The second sensor could alternatively be realized in the form of other types of acceleration, motion or position sensing switch.

Whenever the inhibit signal 64 is low, it blocks the trigger pulse 62 from being further processed by the stimulator circuit. This function is accomplished in the control circuit 60 by an active trigger pulse discriminator circuit 66 that senses the output signals TP and IS, and blocks the signal TP whenever the signal IS is low. When the trigger circuit 50 detects cribbing activity and the inhibit output signal 64 from the inhibit circuit 52 is high, the discriminator circuit 66 passes the trigger signal through to the stimulator circuit 42 in the form of an active trigger pulse (ATP) 68. The stimulator circuit 42 processes the active trigger signal 68 to produce a short duration electrical discharge signal 70 across the electrodes 46, thereby delivering an adverse shock to the horse when cribbing activity is attempted.

Figure 5:
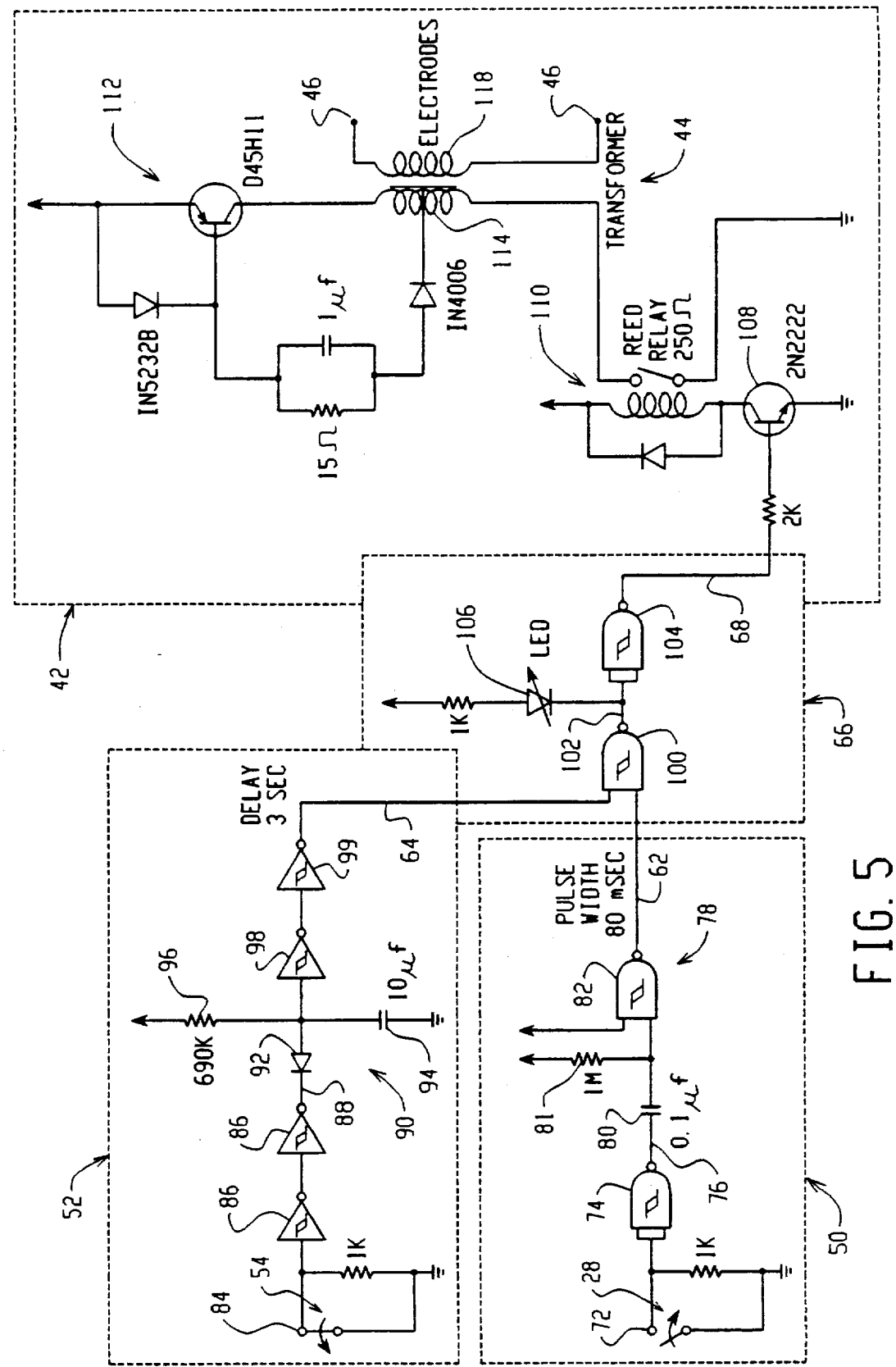
FIG. 5 is a detailed electrical schematic diagram for an exemplary embodiment of the control circuit of FIG. 4.

With reference to FIG. 5, there is illustrated a detailed schematic diagram of one embodiment of a control circuit 60 for carrying out the invention as described hereinbefore. In this embodiment, the first sensor 28 output signal is coupled to an input node 72 to a buffer circuit 74 in the trigger circuit 50. The buffer output 74 is connected to an input of a pulse circuit 78 which includes a timing capacitor 80, a resistor 81 and a logic gate circuit 82. The output of the logic gate 82 is the trigger pulse signal (TP) 62. The capacitor 80 and resistor 81 are selected so as to produce the desired duration for the output pulse 62, such as 80 milliseconds in this embodiment, for example.

The second sensor 54 output is connected to an input node 84 of the inhibit circuit 52 to a double inverting buffer gate 86. The output 88 of the inverter buffer 86 is input to a time delay circuit 90. The delay circuit includes a blocking diode 92, a timing resistor 96 and capacitor 94, a logic circuit 98 and an inverting buffer 99. The output of the buffer 99 is the inhibit signal (IS) 64.

The inhibit signal 64 and the trigger pulse signal 62 are respective inputs to a logic gate 100 of the discriminator circuit 66. The output 102 of the logic gate 100 drives another logic gate 104, the output of which is the active trigger pulse signal 68. Whenever the output 102 of the logic gate 100 goes low, an LED 106 is lit momentarily and provides visual verification of an active trigger pulse 68.

The active trigger pulse signal 68 is input to the stimulator circuit. The active trigger signal 68 drives an NPN transistor switch 108. When the active switch 108 turns on, it closes a relay 110, thereby completing a circuit for current to flow from a supply 112 through a primary winding 114 of the stimulator transformer 44. The transformer 44 is provided with a pulse control circuit 116 as illustrated to produce a series of high frequency high voltage spikes for a duration equal to the width of the active trigger pulse signal 68 (in this case about 80 milliseconds). In an exemplary embodiment, each shock spike applied at the electrodes 46 is about 5,000 volts with a current of about 4 to 5 milliamps, with a time period between spikes of about 1.4 milliseconds.

In operation, power is supplied to the control circuit 60 from the internal batteries 34 in the collar 10. When the first sensor 28 detects contraction of the ventral muscles, the switch 28 momentarily closes. This causes the output 76 to transition from a logic high to a logic low state, thereby discharging the capacitor 80. This causes the output 62 to pulse high for a time period of about 80 milliseconds. Another pulse from the trigger circuit 50 cannot be produced until the sensor 28 returns to an open state.

If the second sensor 54 remains closed during the time the trigger pulse 62 is produced, the inhibit signal 64 is logic high and the trigger pulse 62 passes through the logic gates 100 and 104 to the stimulator circuit 42. If, however, the second sensor 54 opens, thus indicating that the equine activity may be normal activity, the output 88 of the buffer 86 goes logic low, thereby discharging the delay capacitor 94, thus causing the inhibit signal 64 to go logic low. A logic low of the inhibit signal 64 blocks the trigger pulse 62 from passing through the logic gate 100. The inhibit signal 64 stays logic low until the second sensor 54 returns to a normally closed position. This causes the output 88 to go logic high, and the delay capacitor begins charging through the timing resistor 96. After the selected delay time, in this case about 3 seconds, the inhibit signal 64 returns to a logic high and will permit a trigger pulse 62 to pass through the logic gate 100.

The invention thus provides apparatus and methods for substantially reducing equine cribbing behavior by detecting an equine characteristic related to such activity, and further detecting equine activity or movement that inhibits the application of a shock therapy when the movement appears to be normal equine behavior. The invention is realized with an electronic control circuit carried by a collar strapped on the horse that operates from an internal power supply so that cribbing activity can be detected and the shock therapy applied even during free range movement of the horse.

Although the embodiments of FIGS. 1–5 illustrate the shock therapy as being administered in the form of an electrical shock via the electrodes 46, those skilled in the art will appreciate that the control circuit 60, in combination with the sensors 28 and 54, produces a control signal 68 (in the described embodiment, the active trigger pulse) that can be used to control the administration of different types of shock therapy. The control signal 68 can be used, for example, to control application of a vibration, auditory, olfactory or other adverse stimulus in response to cribbing activity, by appropriate selection and use of a suitable transducer preferably carried by the collar 10.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

What is claimed is:

1. Apparatus for substantially reducing equine cribbing behavior, comprising: a collar that can be placed about the neck of a horse, and a control circuit carried by the collar for applying a shock to the horse; the control circuit comprising a first sensor that detects an equine characteristic related to cribbing activity and a second sensor that detects equine activity other than cribbing; the control circuit comprising logic means for preventing the application of a shock to the horse in response to a detected equine cribbing characteristic when the second sensor detects equine activity other than cribbing.

2. The apparatus of claim 1 wherein the control circuit applies an electrical shock to the horse.

3. The apparatus of claim 1 wherein the control circuit controls application of a non-electrical shock to the horse.

4. The apparatus of claim 1 wherein the first sensor is positioned adjacent the ventral cribbing muscles when the collar is placed on the horse.

5. The apparatus of claim 4 wherein the first sensor comprises a switch that changes state when the ventral muscles are used during cribbing activity.

6. The apparatus of claim 1 wherein the second sensor detects movement of the horse's head that could be accompanied by a false indication of cribbing activity by the first sensor.

7. The apparatus of claim 1 wherein the second sensor comprises a tilt switch that detects movement of the horse's head outside a preselected range of movement wherein such movement could be detected by the first sensor as being cribbing activity.

8. The apparatus of claim 7 wherein the second sensor comprises a switch that detects rapid movement of the horse's head.

9. The apparatus of claim 1 wherein the control circuit comprises a portable energy source, the apparatus permitting normal free range activity of the horse when the collar is on the horse and applying the shock during only cribbing activity.

10. The apparatus of claim 1 wherein the collar comprises a poll strap and a brow strap for holding the collar in position on the horse's head with the first sensor adjacent the ventral muscle.

11. The apparatus of claim 10 wherein the collar comprises a pressure pad that contacts the throttle area and is in contact with a first sensor actuator that changes a sensor output when the ventral muscles are contracted.

12. The apparatus of claim 1 wherein the second sensor comprises an omnidirectional tilt switch.

13. The apparatus of claim 1 wherein the control circuit produces a trigger signal to apply an electrical shock to the horse in response to the first sensor, and the second sensor produces an output signal that inhibits the trigger signal from applying a shock to the horse in response to detected normal equine activity.

14. Apparatus for substantially reducing equine cribbing behavior, comprising: a collar that can be placed about the neck of a horse, and a control circuit carried by the collar for producing a control signal that can be used for controlling application of a shock to the horse; the control circuit comprising a first sensor that detects an equine characteristic related to cribbing activity and a second sensor that detects equine activity other than cribbing; the control circuit comprising logic means for producing an output that prevents the application of a shock to the horse in response to a detected equine cribbing characteristic when the second sensor detects equine activity other than cribbing.

15. The apparatus of claim 14 comprising a device for applying an electrical shock to the horse in response to said control signal.

16. The apparatus of claim 15 wherein said device is carried by the collar when the collar is mounted on the horse.

17. The apparatus of claim 14 wherein the first sensor comprises a pressure switch responsive to the condition of the horse's ventral muscles, and the second sensor comprises an omnidirectional switch that detects normal movement of the horse.

18. Method for substantially reducing equine cribbing behavior, comprising the steps of:
(a) electronically detecting an equine characteristic related to cribbing activity;
(b) electronically detecting equine movement other than cribbing that causes false cribbing activity detection; and
(c) applying a shock to the horse only when cribbing activity is detected and equine movement other than cribbing is not detected.

19. The method of claim 18 wherein the step of detecting equine movement other than cribbing includes the step of electronically detecting movement of the horse's head beyond a preselected range of movement.

20. The method of claim 18 wherein the step of detecting equine movement other than cribbing includes the step of electronically detecting rapid movement of the horse's head.

* * * * *

UNITED STATES PATENT AND TRADEMARK OFFICE
CERTIFICATE OF CORRECTION

PATENT NO : 5,722,352
DATED : March 3, 1998
INVENTOR(S) : Leatherman, Nelson E.

It is certified that error appears in the above-identified patent and that said Letters Patent is hereby corrected as shown below:

Column 1, line 30, "horse'neck" should be --horse's neck--.

Signed and Sealed this

Nineteenth Day of May, 1998

Attest:

BRUCE LEHMAN

Attesting Officer  Commissioner of Patents and Trademarks